United States Patent
Chunduri et al.

(10) Patent No.: US 10,735,316 B2
(45) Date of Patent: Aug. 4, 2020

(54) RECEIVER DIRECTED ANONYMIZATION OF IDENTIFIER FLOWS IN IDENTITY ENABLED NETWORKS

(71) Applicant: Futurewei Technologies, Inc., Plano, TX (US)

(72) Inventors: Uma S. Chunduri, Fremont, CA (US); Alexander Clemm, Los Gatos, CA (US); Padmadevi Pillay-Esnault, Santa Clara, CA (US); Yingzhen Qu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 279 days.

(21) Appl. No.: 15/833,180

(22) Filed: Dec. 6, 2017

(65) Prior Publication Data
US 2019/0007307 A1    Jan. 3, 2019

Related U.S. Application Data

(60) Provisional application No. 62/526,773, filed on Jun. 29, 2017.

(51) Int. Cl.
*H04L 12/717* (2013.01)
*H04L 29/06* (2006.01)
(Continued)

(52) U.S. Cl.
CPC .............. *H04L 45/42* (2013.01); *H04L 41/12* (2013.01); *H04L 45/74* (2013.01); *H04L 61/103* (2013.01);
(Continued)

(58) Field of Classification Search
CPC ..... H04L 45/42; H04L 45/74; H04L 41/0893; H04L 41/12; H04L 61/103;
(Continued)

(56) References Cited

U.S. PATENT DOCUMENTS

| 8,966,075 B1 | 2/2015 | Chickering et al. | |
| 2001/0014911 A1* | 8/2001 | Doi ...................... | H04W 4/027 709/221 |

(Continued)

FOREIGN PATENT DOCUMENTS

| CN | 102045314 A | 5/2011 |
| CN | 102075937 A | 5/2011 |

(Continued)

OTHER PUBLICATIONS

Avinatan Hassidim et al., "Ephemeral Identifiers: Mitigating Tracking & Spoofing Threats to BLE Beacons," Apr. 2016, Google Inc., developers.google.com/beacons/eddystone-eid-preprint.pdf (Year: 2016).*

(Continued)

*Primary Examiner* — Ruolei Zong
(74) *Attorney, Agent, or Firm* — Conley Rose, P.C.

(57) ABSTRACT

A method implemented by a receiving host entity comprises transmitting, by a transmitter of the receiving host entity, a message comprising an anonymization policy of the receiving host entity, the message comprising an anonymized identifier of the receiving host entity, the anonymized identifier being an ephemeral identifier of the receiving host entity, and receiving, by a receiver of the receiving host entity, a data packet from a sending host entity, a destination identifier field of the data packet including the anonymized identifier.

20 Claims, 9 Drawing Sheets

(51) Int. Cl.
  *H04L 12/24* (2006.01)
  *H04L 12/741* (2013.01)
  *H04L 29/12* (2006.01)
(52) U.S. Cl.
  CPC ...... *H04L 61/1588* (2013.01); *H04L 61/2084* (2013.01); *H04L 63/0421* (2013.01); *H04L 69/22* (2013.01); *H04L 41/0893* (2013.01)
(58) Field of Classification Search
  CPC ............. H04L 61/2084; H04L 61/1588; H04L 63/0407; H04L 63/0414; H04L 63/0421; H04L 69/22
  USPC ....................................................... 709/238
  See application file for complete search history.

(56) References Cited

U.S. PATENT DOCUMENTS

| | | | |
|---|---|---|---|
| 2007/0019609 A1* | 1/2007 | Anjum | H04L 29/12254 370/349 |
| 2012/0203856 A1 | 8/2012 | Wu et al. | |
| 2012/0281540 A1* | 11/2012 | Khan | H04W 12/1201 370/241 |
| 2012/0311660 A1* | 12/2012 | Park | H04L 41/0893 726/1 |
| 2012/0320815 A1 | 12/2012 | Massena | |
| 2013/0124630 A1 | 5/2013 | Reunamaki et al. | |
| 2014/0141720 A1* | 5/2014 | Princen | H04W 8/005 455/41.2 |
| 2014/0162601 A1 | 6/2014 | Kim et al. | |
| 2014/0357228 A1* | 12/2014 | Luft | H04B 7/0456 455/411 |
| 2015/0024782 A1 | 1/2015 | Edge | |
| 2016/0105361 A1* | 4/2016 | Bishop | H04L 45/74 370/392 |
| 2016/0182497 A1* | 6/2016 | Smith | H04L 63/0853 713/156 |
| 2017/0013450 A1* | 1/2017 | Ziv | H04W 12/06 |
| 2017/0054692 A1 | 2/2017 | Weis | |
| 2017/0134937 A1* | 5/2017 | Miller | G06Q 20/3829 |
| 2017/0269186 A1* | 9/2017 | Sharma | G01S 1/70 |
| 2017/0316106 A1 | 11/2017 | Pillay-Esnault | |
| 2018/0139133 A1 | 5/2018 | Makhijani et al. | |
| 2018/0227301 A1 | 8/2018 | Maruyama et al. | |
| 2018/0253738 A1 | 9/2018 | Benson | |

FOREIGN PATENT DOCUMENTS

| | | |
|---|---|---|
| CN | 104823471 A | 8/2015 |
| EP | 1492306 A2 | 12/2004 |
| EP | 2301169 B1 * | 3/2015 |

OTHER PUBLICATIONS

Chunduri, et al., "Identity Use Cases in Ideas," draft-ccm-ideas-identity-use-cases-01, Jul. 3, 2017, 10 pages.
Postel, "DARPA Internet Program Protocol Specification," Information Sciences Institute, RFC 791, Sep. 1981, 50 pages.
Farinacci, D., et al., "LISP EID Anonymity," XP015112981, draft-farinacci-lisp-eid-anonymity-00, May 6, 2016, 8 pages.
Rui, T., et al., "Network Access Control Mechanism based on Locator/Identifier Split," XP031505400, IEEE International Conference on Networking, Architecture, and Storage, 2009, pp. 171-174.
Yan, Z., et al., "A Novel Mobility Management Mechanism Based on an Efficient Locator/ID Separation Scheme," XP031570381, First International Conference on Future Information Networks, 2009, 6 pages.
Drava, P., et al., "Temporary MAC Addresses for Anonymity," XP040383750, IEEE P802.11, Wireless LANs, Jun. 2002, 17 pages.
Farinacci, et al., "LISP EID Anonymity," draft-farinacci-lisp-eid-anonymity-01, Oct. 31, 2016, 8 pages.
Farinacci, D., et al., "LISP EID Anonymity," draft-farinacci-lisp-eid-anonymity-02, Apr. 12, 2017, 9 pages.
Machine Translation and Abstract of Chinese Publication No. CN102075937, May 25, 2011, 11 pages.
Foreign Communication From a Counterpart Application, PCT Application No. PCT/CN2017/081216, International Search Report dated Jun. 30, 2017, 4 pages.
Foreign Communication From a Counterpart Application, European Application No. 17788703.1, Extended European Search Report dated Feb. 22, 2019, 9 pages.
Office Action dated May 25, 2018, 19 pages, U.S. Appl. No. 15/491,828 filed Apr. 19, 2017.
Office Action dated Mar. 21, 2019, 20 pages, U.S. Appl. No. 15/924,919 filed Mar. 19, 2018.
Herbert, T., et al., "Identifier-locator addressing for IPv6," draft-herbert-nvo3-ila-04, Mar. 13, 2017, 39 pages.
Kompella, K., et al., "Link Bundling in MPLS Traffic Engineering (TE)," RFC 4201, Oct. 2005, 12 pages.
Raza, K., et al., "Controlling State Advertisements of Non-negotiated LDP Applications," RFC 7473, Mar. 2015, 15 pages.
Pillay-Esnault, Ed., et al., "Problem Statement for Identity Enabled Networks," draft-padma-ideas-problem-statement-01, Mar. 12, 2017, 15 pages.
Pillay-Esnault, Ed., et al., "Requirements for Generic Resilient Identity Services in Identity Enabled Networks," draft-padma-ideas-req-grids-00, Mar. 13, 2017, 15 pages.
Farinacci, et al., "Teh Locator/ID Separation Protocol (LISP)," RFC 6830, Jan. 2013, 75 pages.
Moskowitz, Ed., et aL., "Host Identity Protocol Version 2 (HIPv2)," RFC 7401, Apr. 2015, 128 pages.

* cited by examiner

RECEIVER DIRECTED ANONYMIZATION OF IDENTIFIER FLOWS IN IDENTITY ENABLED NETWORKS

CROSS-REFERENCE TO RELATED APPLICATIONS

The present application claims benefit of U.S. Provisional Patent Application No. 62/526,773 filed Jun. 29, 2017 by Uma S. Chunduri, et al. and entitled "Receiver Directed Anonymization of Identifier Flows in Identity Oriented Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Currently, the Internet widely uses Internet Protocol (IP) addresses to identify locations of a host entity, such as a user equipment (UE). An IP address is a numerical label assigned to each host entity participating in a computer network that uses the IP for communication. An IP address serves two principal functions: host or network interface identification and location addressing. Two versions of the IP are in use: IP Version 4 (IPv4) and IP Version 6 (IPv6). Host entities may also be addressed using an identifier that is unique to the host entity. Identifier Enabled Networks (IENs) disassociate an identifier and a location from a host entity such that established communications are not interrupted when a host entity changes location. The identifier and the location of the host entity are publicly known so that other entities may communicate with the host entity. The public availability of the identifier and location of the host entity make it difficult to anonymize the host entity.

SUMMARY

The disclosure includes a method implemented by a receiving host entity, comprising transmitting, by a transmitter of the receiving host entity, a message comprising an anonymization policy of the receiving host entity, the message comprising an anonymized identifier of the receiving host entity, the anonymized identifier being an ephemeral identifier of the receiving host entity, and receiving, by a receiver of the receiving host entity, a data packet from a sending host entity, a destination identifier field of the data packet including the anonymized identifier. In some embodiments, the message further comprises a location of an endpoint network device (END) by which the receiving host entity is reachable, and/or the message is transmitted to an END communicatively coupled to a receiving host entity, and wherein the END transmits the message to a distributed mapping system, and/or a destination address field of the data packet includes a locator of the receiving host entity, wherein the locator is an address of the receiving host entity. In some embodiments, the method further comprises determining whether a header of the data packet includes the anonymized identifier in the destination identifier field of the data packet. In some embodiments, the method further comprises storing, by a memory of the receiving host entity, a local policy indicating whether to accept the data packet including the anonymized identifier, and accepting, by the processor, the data packet when the local policy indicates that data packets including the anonymized identifier are acceptable. In some embodiments, metadata associated with the sending host entity is used to determine the anonymized identifier for the sending host entity.

In an embodiment, the disclosure includes an END associated with a sending host entity, comprising a transmitter configured to transmit a locator request comprising a user identifier (U-ID) of a receiving host entity, the locator request being a request for a locator of the receiving host entity, and the U-ID being a fixed identifier that identifies the receiving host entity, and a receiver coupled to the transmitter and configured to receive the locator of the receiving host entity and an anonymized identifier of the receiving host entity, the anonymized identifier being an ephemeral identifier of the receiving host entity, wherein the transmitter is further configured to transmit a data packet to the receiving host entity, a destination identifier field of the data packet including the anonymized identifier. In some embodiments, the anonymized identifier is determined based on a policy specified by the receiving host entity, and/or the anonymized identifier is only temporarily associated with the receiving host entity, and wherein the anonymized identifier is associated with different host entities at different times, and/or the locator request is received from the sending host entity, and wherein the locator request is transmitted to a distributed mapping system, and/or the data packet is transmitted to an END associated with the sending host entity. In some embodiments, the END further comprises comprising a memory coupled to the transmitter and the receiver and configured to store the anonymized identifier in association with the U-ID of the receiving host entity.

In an embodiment, the disclosure includes a method implemented by a distributed mapping system, comprising receiving, by a receiver of the distributed mapping system, a message comprising an anonymization policy of a receiving host entity, the message comprising an anonymized identifier of the receiving host entity, the anonymized identifier being an ephemeral identifier of the receiving host entity, receiving, by the receiver, a locator request comprising a U-ID of the receiving host entity from a sending host entity, the locator request being a request for a locator of the receiving host entity, the U-ID being a fixed identifier that identifiers the receiving host entity, and determining, by a processor coupled to the receiver, the anonymized identifier for the sending host entity based on the anonymization policy defined by the receiving host entity and metadata describing the sending host entity. In some embodiments, the metadata includes a type of device of the sending host entity. In some embodiments, the method further includes transmitting, by a transmitter coupled to the processor, the anonymized identifier and a locator of the receiving host entity to the sending host entity. In some embodiments, wherein the anonymization policy includes a set of anonymized identifiers, and wherein determining the anonymized identifier for the sending host entity comprises selecting one of the anonymized identifiers in the set of anonymized identifiers for the sending host entity, and/or the message further includes a current locator of the receiving host entity. In some embodiments, the method further comprises receiving, by the receiver, a policy update from the receiving host entity, wherein the policy update comprises an update to the anonymization policy of the receiving host entity. In some embodiments, the metadata comprises private metadata and public metadata.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Host entities in an IEN are identified using an identifier. For example, some identities may be publicly known and not anonymized, which may be referred to here as a U-ID. A U-ID is a publicly available fixed endpoint identifier that identifies the host entity. A host entity in an IEN is also identified using a locator. A locator is an address of a location by which the host entity may be reached. A host entity may register with, or associate with and authenticate with, a distributed mapping system by sending the U-ID and the locator of the host entity to the distributed mapping system (also referred to as distributed GRIDS infrastructure). The distributed mapping system may be a combination of distributed computing resources that are executed together to implement a set of services that manages identification data for various host entities that have registered with the distributed mapping system.

A U-ID of a host entity remains unchanged as a host entity changes locations. Therefore, host entities in IENs typically cannot remain anonymous when communicating with other host entities. Disclosed herein are embodiments directed to an IEN in which host entities register anonymization policies with the distributed mapping system, where the anonymization policies define how to anonymize a host entity during data plane communications. In some embodiments, the distributed mapping system responds to locator requests with an anonymized identifier (also referred to as anonymous ID) based on an anonymization policy registered by the host entity.

Figure 1:
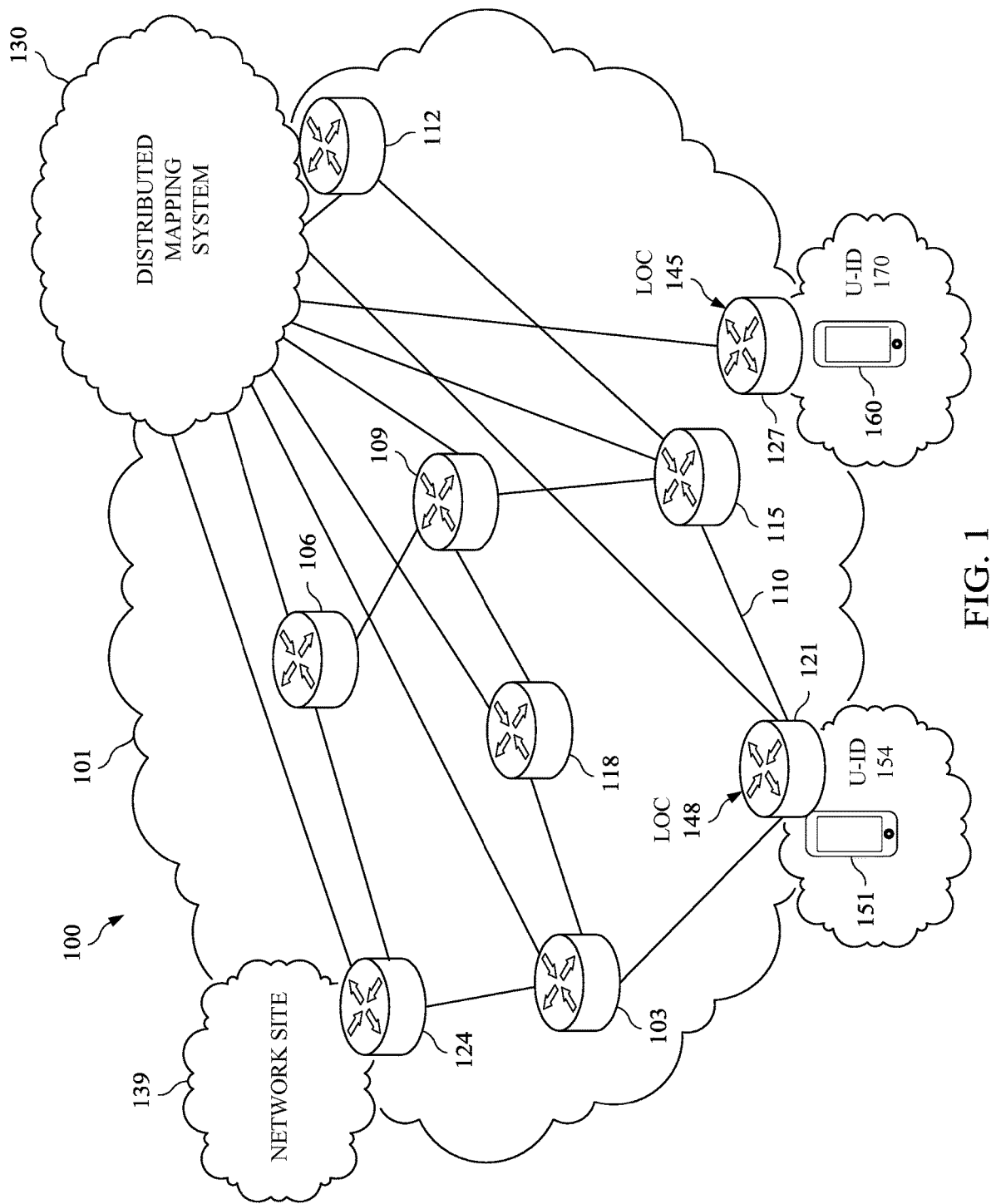
FIG. 1 illustrates an embodiment of an IEN.

FIG. 1 illustrates an embodiment of an IEN 100. For example, the IEN 100 may be a network implementing Locator identifier Separation Protocol (LISP), Host Identity Protocol (HIP), or any other IEN that would be recognized by one of ordinary skill in the art. LISP may be implemented according to Internet Engineering Task Force (IETF) Request for Comments (RFC) 6830, titled "The LOC/ID Separation Protocol," dated January 2013, which is hereby incorporated by reference in its entirety. HIP may be implemented according to IETF RFC 7401, titled "Host Identity Protocol Version 2 (HIPv2), dated April 2015, which is hereby incorporated by reference in its entirety.

IEN 100 generally comprises a plurality of routers 103, 106, 109, 112, 115, and 118, and a plurality of endpoint network devices (ENDs) 121, 124, and 127 (also referred to as identifier oriented network entities). For example, ENDs 121, 124, and 127 may be a router, a switch, a bridge, a gateway, a base station, an access point, or any network device with identifier enabled networking capabilities. Host entities 151 and 160 may be communication endpoints, such as, for example, a UE, a network site, or a software process that needs to be identified.

In some embodiments, routers 103, 106, 109, 112, 115, and 118 may be IP routers or label switch routers (LSRs) that are configured to interconnect ENDs 121, 124, and 127. In an embodiment, the routers 103, 106, 109, 112, 115, and 118 may be a root router, one or more provider edge (PE) routers, one or more source PE routers, one or more rendezvous point (RP) PE routers, one or more customer edge (CE) routers, or one or more core routers. For example, at least one of routers 103, 106, 109, 112, 115, and 118 may be a receiver PE router, a CE router, and/or a source PE router, which is configured to form an interface between the service provider network 101 and one or more CE routers. The routers 103, 106, 109, 112, 115, and 118 may each be a device configured to forward data packets within a network and/or between multiple networks. For example, router 118 may be a router within a service provider network 101 and may be configured to form a portion of a backbone or core for the service provider network 101.

Additionally, the routers 103, 106, 109, 112, 115, and 118 and the ENDs 121, 124, and 127 may be interconnected and in data communication with each other via one or more links 110 (e.g., a wireless link or a wired link). Further, the IEN 100 is configured to employ an IP or non-IP protocol as would be appreciated by one of ordinary skill in the art upon viewing this disclosure. In an embodiment, ENDs 121, 124, and 127 may comprise a local ID-to-locator (ID-to-LOC) mapping database and/or an anonymized ID-to-LOC mapping database, as will be further discussed below.

In an embodiment, one or more of ENDs 121, 124, and 127 may generally be characterized as a PE router where a host entity, such as host entities 151 and 160, is attached such that the host entity is reachable by an END. As shown in FIG. 1, host entity 151 is associated with, or reachable by, END 121, and host entity 160 is associated with END 127. For example, network site 139 may be a host entity behind END 124. A host entity 151 or 160 is a device, node, or software process used for Internet Protocol (IP)-based or Layer-2 based data communication. Each of the routers 103, 106, 109, 112, 115, and 118 and ENDs 121, 124, and 127 may be configured to employ a routing table, forwarding table, network table, or the like, to control and/or direct data traffic for a given network. For example, each of the routers 103, 106, 109, 112, 115, and 118 and ENDs 121, 124, and 127 may generate or establish a routing table to coordinate data communication with other routers within the IEN 100. In an example embodiment, the routing table may be established via a flooding algorithm, a spanning trees algorithm, a reverse path broadcasting algorithm, a truncated reverse path broadcasting algorithm, a reverse path multicasting algorithm, a core-based tree algorithm, or any other suitable multicast forwarding algorithm as would be appreciated by one of ordinary skill in the art upon viewing this disclosure.

The IEN 100 also includes a distributed mapping system 130, which may be configured to execute GRIDS for host entities 151 and 160. GRIDS is a set of services that together manage the lifecycle of identifiers for host entities 151 and 160, register anonymization policies of host entities 151 and 160, map and resolve identifiers and locators of host entities 151 and 160, and associate metadata with host entities 151 and 160 and entity collections. The set of services that are provided by GRIDS includes, for example, a mapping service, a metadata service, and a policy service, as will be further discussed below. In an embodiment, distributed mapping system 130 is configured to execute these services to provide GRIDS to host entities 151 and 160 that have registered with the distributed mapping system 130.

The distributed mapping system 130 may be configured to execute a set of services for host entities 151 and 160 that have registered with the distributed mapping system 130, such as identifier lifecycle services, mapping services, metadata services, and other services for host entities 151 and 160. The distributed mapping system 130 may be configured to execute the set of services that together manage the lifecycle of identifiers for host entities 151 and 160, register host entities 151 and 160, map and resolve identifiers and locators of host entities 151 and 160, and obtain metadata identifying and describing host entities 151 and 160 and entity collections. For example, the distributed mapping system 130 may be a distributed GeneRic Identity Services (GRIDS) (also referred to as a General Identity Service (GRIDS)) system configured to execute GRIDS. GRIDS is a similar set of services that together manage the lifecycle of identifiers for host entities 151 and 160, register host entities 151 and 160, map and resolve identifiers and locators of host entities 151 and 160, and obtain metadata identifying and describing host entities 151 and 160 and entity collections. The GRIDS are further described in IETF draft document entitled "Requirements for Generic Identity Services in Identity Enabled Networks," dated Jul. 3, 3017, version 1, which is hereby incorporated by reference in its entirety. The distributed mapping system 130 is also configured to register U-IDs, advertise U-IDs, and aggregate U-IDs into a distributed database so that NEs over various geographic areas can locate a host entity 151 or 160 associated with a U-ID. In an embodiment, the distributed mapping system 130 stores ID-to-LOC mappings of all the host entities 151 and 160 and network sites 139 in IEN 100. The distributed mapping system 130 may be connected to routers 103, 106, 109, 112, 115, and 118 and ENDs 121, 124, and 127 via links 110. In an embodiment, the distributed mapping system 130 may be deployed in a cloud computing environment. For example, the distributed mapping system 130 may be deployed as an infrastructure comprising a plurality of distributed servers. The distributed mapping system 130 may include multiple access points that are located proximate to host entities 151 and 160 and/or ENDs 121, 124, and 127.

In some embodiments, the distributed mapping system 130 comprises a database storing metadata for each host entity 151 and 160, anonymization policies governing how to anonymize the host entities 151 and 160, and locators for each of the host entities 151 and 160. According to some embodiments, each host entity 151 and 160 is associated with one or more anonymized identifiers, which may be determined by the host entity 151 and 160 itself, a third party administrator entity, or the distributed mapping system 130.

The way of anonymizing a host entities 151 and 160 may be as defined in U.S. patent application Ser. No. 15/491,828, entitled "Anonymous Identity in Identity Oriented Networks and Protocols," by Padmadevi Pillay-Esnault, filed Apr. 19, 2017, which is hereby incorporated by reference in its entirety. An anonymized identifier may be any string of alphanumeric characters that identifies a host entity and is private such that the anonymized identifier may not be publicly advertised and a third party may not be able to determine that the anonymized identifier uniquely identifies a particular host entity. An anonymized identifier may be an ephemeral ID, or a temporal identifier that is fleeting in nature. For example, the anonymized identifier may be of any form, such as, for example, an IP address, a Fully Qualified Domain Name (FQDN), or a proprietary format. For example, an anonymized identifier may have a limited purpose and lifetime and may be recycled to use again to identify the host entity or another host entity. A host entity may have several anonymized identifiers that identify the host entity at one time. For example, different applications executing on a host entity simultaneously may use different anonymized identifiers. The host entity may also use the U-ID and the anonymized identifiers to communicate with other host entities and network sites simultaneously. The distributed mapping system 130 will maintain all the anonymized identifiers and anonymization policies on behalf of each of the host entities that have registered with the distributed mapping system 130.

In some embodiments, each END 121, 124, and 127 identifies the U-IDs that are accessible by the END 121, 124, and 127 and sends the U-IDs in addition to the locator of the END 121, 124, and 127 to the distributed mapping system 130. As shown in FIG. 1, the U-ID 154 is an identifier assigned to host entity 151, which is communicatively coupled to END 121. END 121 has an address of locator 148 (shown as LOC 148 in FIG. 1), and therefore, the distributed mapping system 130 maps U-ID 154 to locator 148. Similar, U-ID 170 is an identifier assigned to host entity 160, which is communicatively coupled to END 127. END 127 has an address of locator 145 (shown as LOC 145 in FIG. 1), and therefore, the distributed mapping system 130 maps U-ID 170 to LOC 145.

A receiving host entity, such as host entity 151, is a host entity that receives data plane traffic from a sending host entity. A sending host entity, such as host entity 160, sends the data plane traffic to the receiving host entity 151. Before a sending host entity 160 initiates communication with a receiving host entity 151, the sending host entity 160 must send a locator request to resolve the receiving host entity's locator. The locator is a location, such as an IP address, a Media Access Control (MAC) address, or a label, of an END 121 by which the receiving host entity 151 can be reached. In response to a locator request made for a receiving host entity's 151 locator, the distributed mapping system 130 will subsequently return not just the locator 148, but may also return the anonymized identifier which the sending host entity 160 should use to identify the receiving host entity 151 in the data plane.

Each of the receiving host entity 151 and the sending host entity 160 is associated with a globally unique U-ID. While the global uniqueness of a U-ID is useful to handle the location separation of mobility and movement of nodes, the global uniqueness of a U-ID makes the receiving host entity 151 and the sending host entity 160 vulnerable to unwanted contact. A global U-ID cannot hide its identity nor repel unwanted traffic once a U-ID is paired with a locator at the distributed mapping system 130. IENs 100 do not enforce any restrictions on access to resolve a U-ID, and anonymity cannot be guaranteed for a host entity 151 and 160. In addition, the ability to send traffic to a specific U-ID cannot be prevented if the U-ID is known at some time by any other entity in IEN 100, regardless of whether the U-ID is encrypted.

According to some embodiments, the receiving host entity 151 may seek anonymized communications by generating anonymization policies that determine how to anonymize the host entity 151. Each host entity 151 or 160 may specify and/or receive from a GRIDS infrastructure one or more anonymized identifiers. These anonymized identifiers indicate how to identify the host entity 151 or 160 in the data plane. Each host entity 151 and 160 may also generate anonymization policies that govern how the host entity 151 and 160 is to be anonymized respectively, while receiving data traffic. The distributed mapping system 130 may store metadata associated with each of the host entities 151 and 160 when host entities 151 and 160 have registered with the distributed mapping system 130. In an embodiment, the distributed mapping system 130 is configured to determine an anonymized identifier based on the anonymized identifiers specified by the receiving host entity 151, anonymization policies specified by the receiving host entity 151, and metadata describing a sending host entity 160 and/or the receiving host entity 151. The distributed mapping system 130 is configured to transmit the determined anonymized identifier to the sending host entity 160 such that the sending host entity 160 transmits data traffic on the data plane with the anonymized identifier instead of the U-ID.

In order to incentivize the sending host entity 160 to use that anonymized identifier instead of the publicly known U-ID, additional policies may be set to throttle traffic or drop traffic altogether at the receiving host entity 151 unless the sending host entity 160 uses the preferred anonymous identifier of the receiving host entity 151. By combining the locator resolution with the providing of an anonymized receiving host entity 151 ID, no additional cost is incurred to the sending host entity 160 (no additional messaging round trip), because the receiving host entity's 151 anonymous identifier can be provided to the sending host entity 160 at the time the location is resolved. Likewise, corresponding policies can be setup by the receiving host entity 151 when the host entity initially updates the distributed mapping system 130 with the anonymized identifiers and location information.

Figure 2:
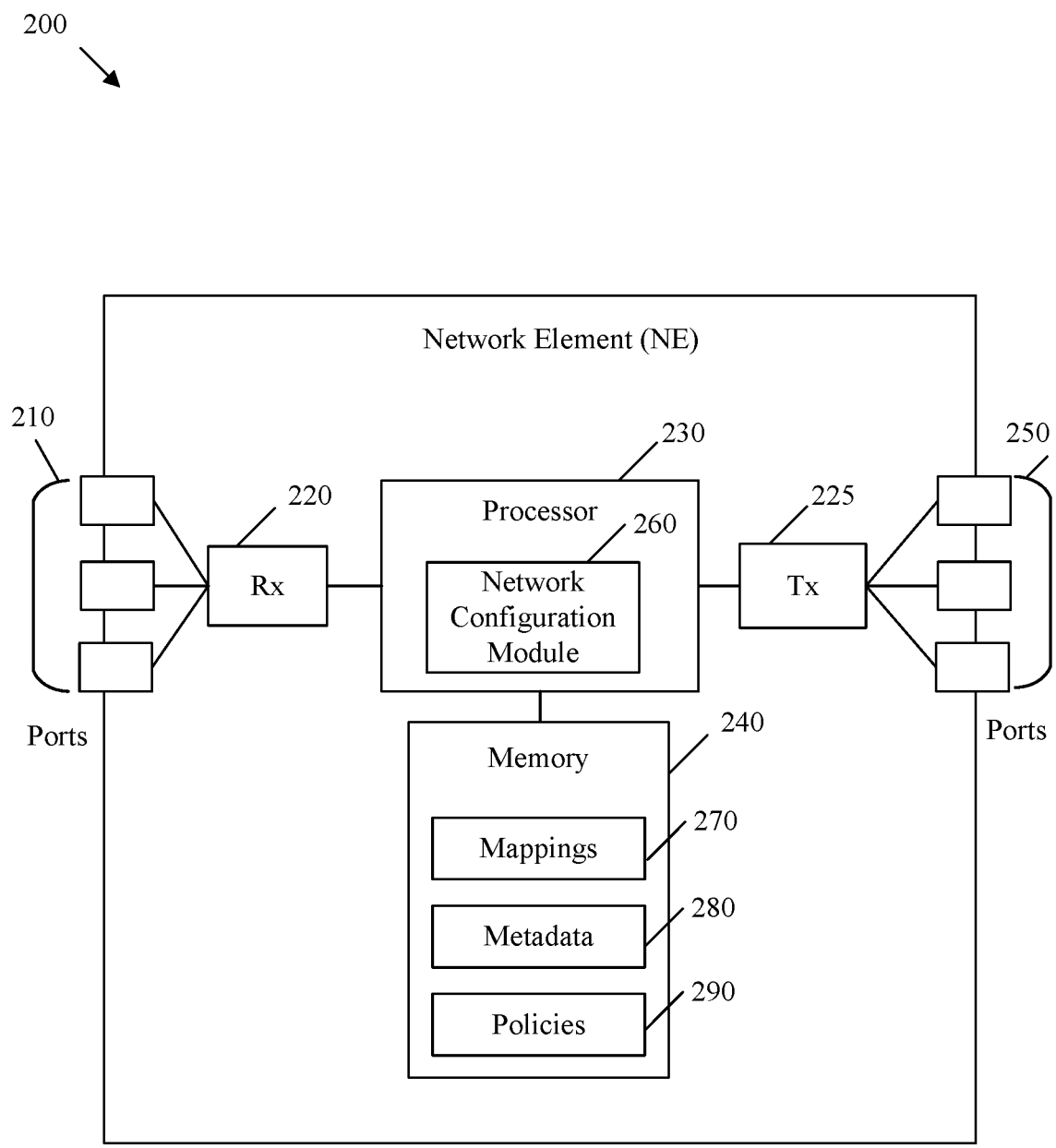
FIG. 2 is a diagram of a network element (NE) in an IEN.

FIG. 2 is a diagram of a NE 200 in an IEN. NE 200 may be similar to the distributed mapping system 130, ENDs 121, 124, and 127, and/or host entities 151 and 160. The NE 200 may be configured to implement and/or support the anonymity mechanisms described herein. The NE 200 may be implemented in a single node or the functionality of NE 200 may be implemented in a plurality of nodes. One skilled in the art will recognize that the term NE encompasses a broad range of devices of which NE 200 is merely an example. The NE 200 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 200. For instance, the features and/or methods in the disclosure may be implemented using hardware, firmware, and/or software installed to run on hardware. As shown in FIG. 2, the NE 200 comprises one or more ingress ports 210 and a receiver unit (Rx) 220 for receiving data, at least one processor, logic unit, or central processing unit (CPU) 230 to process the data, transmitter unit (Tx) 225 and one or more egress ports 250 for transmitting the data, and a memory 240 for storing the data.

The processor 230 may comprise one or more multi-core processors and be coupled to a memory 240, which may function as data stores, buffers, etc. The processor 230 may be implemented as a general processor or may be part of one or more application specific integrated circuits (ASICs) and/or digital signal processors (DSPs). The processor 230 may comprise a network configuration module 260, which may perform processing functions of the host entities 151 and 160, ENDs 121, 124, and 127, or the distributed mapping system 130, as discussed more fully below, and/or any other method discussed herein. As such, the inclusion of the network configuration module 260 and associated methods and systems provide improvements to the functionality of the NE 200. Further, the network configuration module 260 effects a transformation of a particular article (e.g., the network) to a different state. In an alternative embodiment, network configuration module 260 may be implemented as instructions stored in the memory 240, which may be executed by the processor 230.

The memory 240 may comprise a cache for temporarily storing content, e.g., a random-access memory (RAM). Additionally, the memory 240 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 240 may be configured to store mappings 270, metadata 280, and policies 290. Mappings 270 may comprise the ID-to-LOC mappings and/or anonymized ID-to-LOC mappings for the host entities 151 and 160 and ENDs 121, 124, and 127 in the IEN 100. Metadata 280 may comprise metadata or information regarding host entities 151 and 160 and ENDs 121, 124, and 127 in the IEN 100. Policies 290 may comprise the anonymization policies that govern how to determine and distribute an anonymized identifier to a sending host entity 151 or 160.

When NE 200 is a receiving host entity 151, the processor 230 may obtain anonymization policies that govern how the receiving host entity 151 is to be anonymized against other host entities. The memory 240 may store these anonymization policies. The Tx 225 may transmit the anonymization policies to the distributed mapping system 130. The Rx 220 may subsequently receive data packets from other host entities in which the destination identifier in the data packets include an anonymized identifier as determined according to the anonymization policies. When NE 200 is an END 121 acting on behalf of the receiving host entity 151, the processor 230, memory 240, Tx 225, and Rx 220 perform similar functions.

When NE 200 is a sending host entity 160, the Tx 225 may send a locator request to the distributed mapping system 130. The Rx 220 may then receive a locator of the receiving host entity 151 and an anonymized identifier by which to identify the receiving host entity 151. The memory 240 may store the locator and anonymized identifier for the receiving host entity 151. The Tx 225 may send data packets to the receiving host entity 151 with the anonymized identifier as the destination identifier in a header of the data packet. When NE 200 is an END 127 acting on behalf of the sending host entity 160, the processor 230, memory 240, Tx 225, and Rx 220 perform similar functions.

When NE 200 is the distributed mapping system 130, the Rx 220 receives the anonymization policies from the receiving host entity 151 or END 121 acting on behalf of the receiving host entity 151. The memory 240 stores the anonymization policies of the receiving host entity 151 and metadata of the receiving host entity 151 and the sending host entity 160. Tx 225 provides the locator and anonymized identifiers of the receiving host entity 151 to the sending host entity 160 upon receiving a locator request from the sending host entity 160. In some embodiments, NE 200 may be a data center or cloud fabric with several processor 230s and memory 240s interconnected to one another. In some embodiments, Tx 225 and Rx 220 may be one or more data center gateways.

It is understood that by programming and/or loading executable instructions onto the NE 200, at least one of the processor 230 and/or memory 240 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus.

Figure 3:
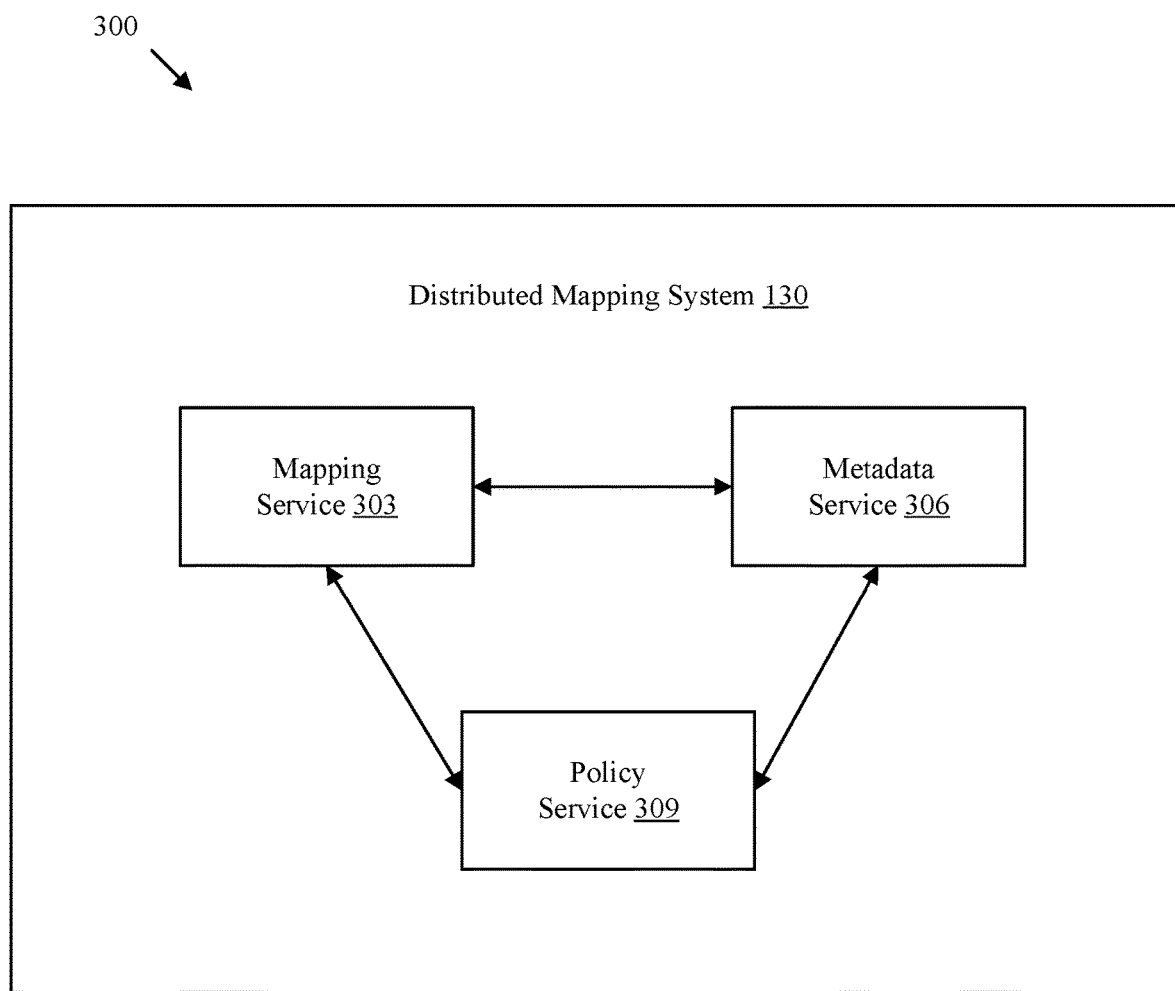
FIG. 3 illustrates an embodiment of a distributed mapping system that implements GRIDS.

FIG. 3 illustrates an embodiment 300 of a distributed mapping system 130 that implements GRIDS. The distributed mapping system 130 implements GRIDS, such as a mapping service 303 (also referred to as GRIDS-MS), a metadata service 306 (also referred to as GRIDS-Meta), and a policy service 309 (also referred to as GRIDS-PS). While only a mapping service 303, metadata service 306, and policy service 309 are shown as the services provided by the distributed mapping system 130, it should be appreciated that the distributed mapping system 130 may be additionally configured to execute several other IEN services, such as identifier lifecycle services (to register, assign, and retire identifiers), subscription services (for example, to subscribe to updates regarding mapping data and metadata associated with a given identifier), and grouping services (for example, to group multiple identifiers of an endpoint). The distributed mapping system 130 comprises the relevant hardware and software configured to execute the mapping service 303, the metadata service 306, the policy service 309, and other services that may be provided to host entities 151 and 160 in IEN 100.

The mapping service 303 is configured to register host entities 151 and 160 and ENDs 121, 124, and 127 with their respective U-IDs, anonymized identifiers, and locators. In an embodiment, the distributed mapping system 130 is configured to store a mapping table that maps host entities 151 and 160 with their associated U-IDs 154 and 170, anonymized identifiers, and locators. The mapping service 303 may be configured to determine a locator and an anonymized identifier for a sending host entity 160 requesting a locator for the receiving host entity 151. For example, when a sending host entity 160 sends a request to the distributed mapping system 130 for a locator associated with receiving host entity 151, the mapping service 303 is configured to determine the locator for receiving host entity 151 and an anonymized identifier for receiving host entity 151.

In an embodiment, the metadata service 306 is configured to store and update metadata associated with each of the host entities 151 and 160 and ENDs 121, 124, and 127 in IEN 100. For example, when NE 200 is the distributed mapping system 130, then metadata 280 in memory 240 may store the metadata associated with each of the host entities 151 and 160 and ENDs 121, 124, and 127. In an embodiment, the metadata comprises data identifying and describing the host entities 151 and 160. In an embodiment, the metadata may contain information such as the nature of the host entities 151 and 160 or a type of device of the host entities 151 and 160. For example, the metadata indicates whether the sending host entity 160 is a mobile device, a wearable device, an Internet of Things (IoT) device, or a smart vehicle.

In an embodiment, the distributed mapping system 130 executes the policy service 309 to store and update anonymization policies associated with the various host entities 151 and 160. In an embodiment, the anonymization policy may be generated by a receiving host entity 151 and then sent to the distributed mapping system 130. In another embodiment, the distributed mapping system 130 may generate one or more anonymization policies on behalf of the receiving host entity 151. In an embodiment, the distributed mapping system 130 stores the anonymization policy received from the receiving host entity 151 in policies 290 of memory 240.

The anonymization policies govern how to anonymize each of the host entities 151 and 160 and distribute the anonymized identifiers to other host entities 151 and 160. For example, the anonymization policy may include a rule instructing the distributed mapping system 130 to use random anonymized identifiers from a range of anonymized identifiers (anonymous pool) for a sending host entity 160. As another illustrative example, the anonymization policy may include a rule instructing the distributed mapping system 130 to send a specific anonymized identifier "x" as identifying a receiving host entity 151 to sending host entity 160 associated with certain metadata. For example, suppose the receiving host entity 151 specifies a first anonymization policy instructing the distributed mapping system 130 to send the anonymized identifier "x" to a sending host entity 160 requesting the locator of the receiving host entity 151 when the sending host entity 160 is a mobile phone, which may be identified through host entity 160's metadata. Suppose the receiving host entity 151 also specifies a second anonymization policy instructing the distributed mapping system 130 to send the anonymized identifier "y" to a sending host entity 160 requesting the locator of the receiving host entity 151 when the sending host entity 160 is an IOT device. In an embodiment, the distributed mapping system 130 stores the first and the second anonymization policy in association with a U-ID of the receiving host entity 151. In some embodiments, a current locator of the receiving host entity 151, anonymized identifiers that are currently used to refer to receiving host entity 151, and other metadata describing the receiving host entity 151 may also be stored in association with a U-ID of the receiving host entity 151. For example, the distributed mapping system 130 may store information indicating the anonymized identifiers that were given to certain sending host entities 160 on behalf of the receiving host entity 151.

As yet another illustrative example, the anonymization policies may include a rule instructing the distributed mapping system 130 to generate a new anonymized identifier to send to every sending host entity 160. Anonymization policies may also include other information regarding a communication session with a receiving host entity 151. For example, the anonymization policies may include information regarding how to distribute one of the anonymized identifiers for communication to the sending host entity 160 based on the requester type, how to distribute one of the anonymized identifiers for communication to the sending host entity 160 based on the geographical location of the sending host entity 160, how many anonymized identifiers can be allocated for a receiving host entity 151 and given to an associated END 121, 124, and 127, how many times an anonymized identifier can be recycled, or how long these identifiers should be in use (a time value or for how many unique sending host entities 160). A strict policy can be set so that a new anonymized identifier is determined for each communication session and for each sending host entity 160. This strict policy has an additional cost of notifying END 121 or the receiving host entity 151 of the new anonymized identifier before providing the new anonymized identifier to the sending host entity 160.

In some embodiments, anonymization policies include rules by which the distributed mapping system 130 is to determine an anonymized identifier of a receiving host entity 151 for a sending host entity 160. For example, when a sending host entity 160 queries the distributed mapping system 130 for locator of the receiving host entity using a U-ID of the receiving host entity 151, the distributed mapping system 130 may first determine an identity of the sending host entity 160. In an embodiment, the distributed mapping system 130 searches for metadata associated with the identity of the sending host entity 160. The distributed mapping system 130 then uses the U-ID of the receiving host entity 151 and the metadata of the sending host entity 160 to determine an anonymization policy that should be applied to determine an anonymized identifier of the receiving host entity 151. The anonymization policy is one of the anonymization policies that was previously sent by the receiving host entity 151 to the distributed mapping system 130 and stored at the distributed mapping system 130.

In an embodiment, the anonymization policies may be refined based on an identity and metadata of the sending host entity 160. In an embodiment, the anonymized identifiers of the receiving host entity 151 are provided to the receiving host entity 151 or generated by the receiving host entity 151 before data is received using any of those anonymized identifiers. This enables the receiving host entity 151 to set up a local policy to identify packets in which the anonymized identifier is used as the destination identifier in the header of the packet. For example, the receiving host entity 151 may set up a local policy for enforcing the anonymized identifier in which the receiving host entity 151 only accepts packets in which the anonymized identifier is set as the destination identifier in the header of the packets. The anonymized identifier in the header of the packet should correspond to the anonymization policy that is registered with the distributed mapping system 130 for the sending host entity 160. In an embodiment, packets including other anonymized identifiers as the destination identifier are filtered out. The anonymization policies can be removed/added periodically upon request by the entity or by the distributed mapping system 130.

In an embodiment, the mapping service 303, metadata service 306, and policy service 309 may all be implemented centrally and co-located in one distributed mapping system 130 that is centrally available to all the routers, ENDs, and host entities in the network. For example, a distributed mapping system 130 can be in a server at one operator. The distributed mapping system 130 may also be located in a cloud or one or more remote data centers. Inter provider GRIDS data may be exchanged as needed. In another embodiment, the mapping service 303, metadata service 306 and the policy service 309 may be distributed throughout the network such that multiple processors 230 and memories 240 are used separately to implement the functions of the mapping service 303, metadata service 306, and the policy service 309.

Figure 4:
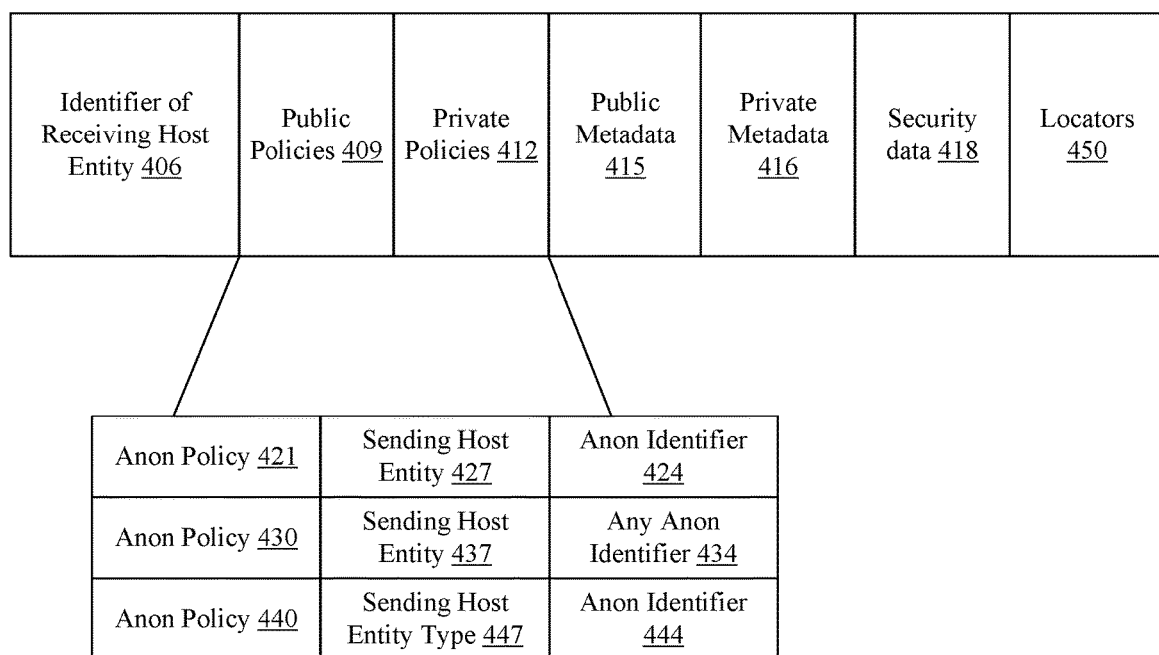
FIG. 4 is a diagram illustrating the information that a distributed mapping system maintains to provide the mapping service, metadata service, and policy service to host entities.

FIG. 4 is a diagram illustrating the information 400 that distributed mapping system 130 maintains to provide the mapping service 303, metadata service 306, and policy service 309 to host entities 151 and 160. While the information 400 is shown in a format using a single table, it should be understood that FIG. 4 illustrates an abstraction of how information 400 may be stored at one or more distributed mapping systems 130. It should be appreciated that information 400 may be stored in any format or manner according to different database schema, and information 400 may be stored in a single table or database or multiple different tables or databases. For example, one table or database may include identifier-to-locator mappings and another table may include other information not including the identifier-to-locator mappings.

The distributed mapping system 130 may store data associated with multiple host entities 151 and 160, each host entity 151 or 160 is associated with an identifier 406. An identifier 406 is a private identifier or reference to a host entity 151 or 160 that may not be used on the data plane or shared with other endpoints. The identifier 406 of a host entity 151 or 160 may be private so that only the distributed mapping system 130 may obtain an identifier 406 of a host entity 151 or 160.

In an embodiment, each identifier 406 of a receiving host entity 151 has associated public policies 409, private policies 412, public metadata 415, private metadata 416, security data 418. The policies may be stored and regulated according to whether the policy is a public policy 409 or a private policy 412. A public policy 409 is accessible to other ENDS 124 and other sending host entities 160. A private policy 412 is only accessible to the receiving host entity 151 that set the private policy 412. The public policies 409 and the private policies 412 may each include various anonymization policies specified by the receiving host entity 151. As shown in FIG. 4, receiving host entity 151 may have specified anonymization policies 421, 430, and 440. Anonymization policy 421 may indicate that for sending host entity 427, the anonymized identifier 424 should be used. Anonymization policy 430 may indicate that for sending host entity 437, any anonymized identifier 434 may be used. In this case, the receiving host entity 151 does not specify a specific anonymized identifier for the sending host entity 437, but rather instructs the use of any random anonymized identifier. Anonymization policy 440 may indicate that for a sending host entity type 447, the anonymized identifier 444 should be used. For example, if the sending host entity type 447 is a camera device, then the anonymization policy 440 indicates that the receiving host entity 151 should be addressed using the anonymized identifier 444 when communicating with camera devices.

The anonymization policies 421, 430, and 440 may each indicate whether they are a public policy 409 or a private policy 412. In some embodiments, there may be different categories of anonymization policies. For example, one category of anonymization policies includes the policies that are directed to specific sending host entities 160. Another category of anonymization policies include metadata directed policies, such as the anonymization policy 440 that defines an anonymized identifier 444 for a specific sending host entity type 447.

In an embodiment, the metadata may be stored and regulated according to whether the metadata is public metadata 415 or private metadata 416. Public metadata 415 is accessible to other ENDS 124 and other sending host entities 160. Private metadata 416 is only accessible to the receiving host entity 151 that the private metadata 416 is associated with. In an embodiment, the security data 418 includes security mechanisms that a receiving host entity 151 may be configured to implement to prevent unnecessary data packets from being received. For example, the security data 418 may indicate data associated with other sending host entities 160 that are not permitted to communicate with the receiving host entity 151. The identifiers 419 include U-IDs 421 and anonymized identifiers 430, 440 that are associated with the receiving host entity 151.

In some embodiments, information 400 may also include mappings of locators 450 to identifiers 406 of the receiving host entity 151. The locators 450 includes locators 450, or IP addresses, of ENDs 121, 124, 127 currently associated with the receiving host entity 151 and/or previously associated with the receiving host entity 151. In an embodiment, one locator 450 may be associated with the identifier 406 and all of the anonymized identifiers 424, 434, and 444 of the receiving host entity 151. Locators 450 for a receiving host entity 151 change rapidly as the receiving host entity 151 may, for example, change locations. For this reason, the mappings of locators 450 to identifiers 406 for the receiving host entity 151 may be separated from the anonymization policies (e.g., public policies 409, private policies 412), private metadata 416, and security data 418 for the receiving host entity 151. In an embodiment, the associations between identifiers 406 and locators 450 for the receiving host entity 151 may be stored in a mapping table that is separate and distinct from the anonymization policies (e.g., public policies 409, private policies 412), private metadata 416, and security data 418 for the receiving host entity 151. In some embodiments, the identifier 406 and anonymized identifiers 430 and 440 may be associated to the same locator 450 or to different locators 450. Each identifier 406 or anonymized identifiers 430 and 440 may have different locators 450.

While FIG. 4 only shows one identifier 406 of a receiving host entity 406 and three sending host entities 427, 437, and 447, it should be appreciated that information 400 includes data related to any number of receiving and sending host entities. While FIG. 4 shows that anonymized identifier 430 is associated with one locator 434 and anonymized identifier 440 is associated with locator 444, each anonymized identifier 430 and 440 may be associated with one or more locators 434 and 444. The same anonymized identifier 430 and 440 may be associated with many different applications or sending host entities.

In an embodiment, a receiving host entity 151 may register with the distributed mapping system 130 by sending a message with the U-ID 421 of the receiving host entity 151. The distributed mapping system 130 may authenticate the receiving host entity 151 and send a confirmation message back to the receiving host entity 151. At this point, the distributed mapping system 130 may obtain metadata associated with the receiving host entity 151. In an embodiment, the receiving host entity 151 may then send additional information to the distributed mapping system 130 after subscription. For example, the receiving host entity 151 or END 121 acting on behalf of the receiving host entity 151 may transmit public policies 409, private policies 412, public metadata 415, and private metadata 416 to the distributed mapping system 130. The distributed mapping system 130 is configured to store the public policies 409, private policies 412, public metadata 415, and private metadata 416 in association with the identifier 406 of the receiving host entity 151. In an embodiment, the receiving host entity 151 or END 121 acting on behalf of the receiving host entity 151 may transmit updates to public policies 409, private policies 412, public metadata 415, and private metadata 416 to the distributed mapping system 130. The distributed mapping system 130 is configured to update the public policies 409, private policies 412, public metadata 415, and private metadata 416 in association with the identifier 406 of the receiving host entity 151 accordingly.

Figure 5:
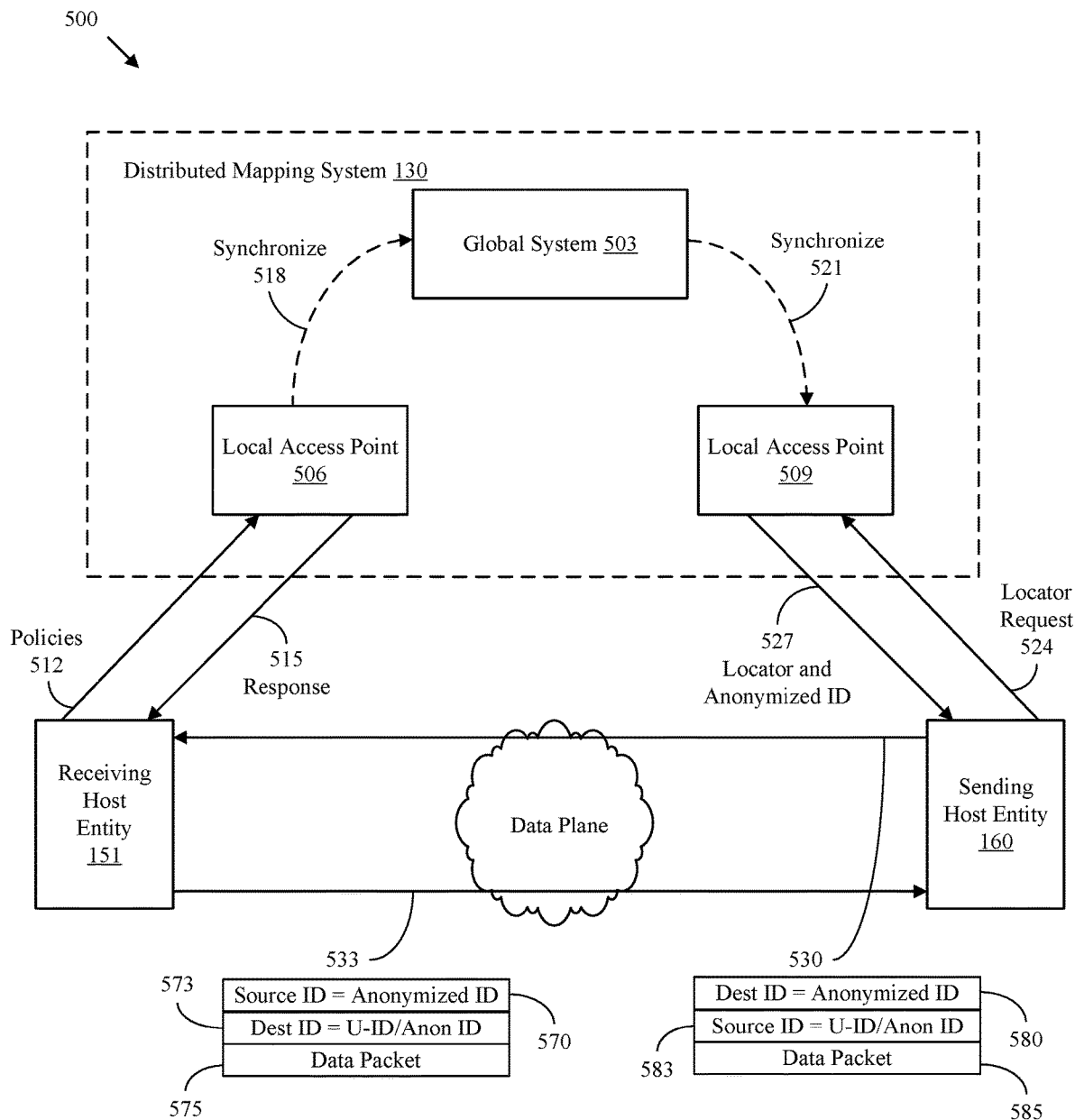
FIG. 5 illustrates an IEN implementing receiver directed anonymization using a host based communication scheme according to an embodiment of the disclosure.

FIG. 5 illustrates an IEN 500 implementing receiver directed anonymization using a host based communication scheme according to an embodiment of the disclosure. For example, IEN 500 is similar to IEN 100, except that IEN 500 implements a host based communication scheme, such as HIP, where host entities 151 and 160 can communicate directly with the distributed mapping system 130 without the use of ENDs 121 and 127. As shown FIG. 5, IEN 500 includes the distributed mapping system 130, the receiving host entity 151, and the sending host entity 160. The distributed mapping system 130 includes a local access point 506 (also referred to as local GRIDS infrastructure) and a local access point 509. Local access point 506 may be located proximate to the receiving host entity 151 such that the local access point 506 serves the receiving host entity 151. Similarly, local access point 509 may be located proximate to the sending host entity 160 such that the local access point 509 serves the sending host entity 160. The local access point 509 may be a NE similar to NE 200 that accesses the GRIDS shown in FIG. 3. The local access points 506 and 509 each communicate and synchronize with the global system 503 (also referred to as global GRIDS infrastructure). The global system 503 synchronizes and consolidates information received from both the local access points 506 and 509. While only two host entities 151 and 160 and two local access points 506 and 509 are shown in FIG. 5, it should be appreciated that any number of host entities and local access points may be part of IEN 500.

At arrow 512, the receiving host entity 151 sends a message comprising one or more anonymization policies to the local access point 506. For example, a Tx 225 of the receiving host entity 151 sends the message comprising the anonymization policies to the local access point 506. In an embodiment, the message may be sent after the receiving host entity 151 registers with the distributed mapping system 130. In an embodiment, the message may be a new message that the requesting host entity 151 sends to the local access point 506. In an embodiment, the message may be an extension of a pre-existing message for HIP as defined in RFC 7401 such that the anonymization policies are included in the pre-existing message.

In an embodiment, the message may be sent when the receiving host entity 151 is registering or updating a current locator of host entity 151 with the distributed mapping system 130. In this embodiment, the message may further include a U-ID of the receiving host entity 151, a current locator of the receiving host entity 151, and the anonymization policies of the receiving host entity 151. In some embodiments, the message may be sent by the receiving host entity 151 at any time regardless of whether the receiving host entity 151 is changing locations.

In some embodiments, the message with the anonymization policies may be sent in a tuple format including an identifier of a sending host entity 160 and anonymized identifier of the receiving host entity 151 to provide to that sending host entity 160. For example, the message sent at arrow 512 may include a tuple as follows: (the identifier of the sending host entity 160, anonymized identifier of the receiving host entity). As described above, the message sent at arrow 512 may include other information aside from an identifier of the sending host entity 160 and the anonymized identifier of the receiving host entity 151.

The message may comprise new anonymization policies or updates to existing anonymization policies for the receiving host entity 151. For example, suppose receiving host entity 151 sends the message including three different anonymization policies. The first anonymization policy may indicate that the distributed mapping system 130 is to select one anonymized identifier from a set, or pool, of anonymized identifiers for all sending host entities 160 that are requesting a locator of the receiving host entity 151. The set of anonymized identifiers may include any number of anonymized identifiers as specified by the receiving host entity 151. Each of the anonymized identifiers may be recyclable such that the same anonymized identifier may be sent to different sending host entities 160 when the receiving host entity 151 indicates that such recyclability is permitted. In one embodiment, the receiving host entity 151 may generate the set of anonymized identifiers and send the set of anonymized identifiers to the local access point 506 in the message. In another embodiment, the receiving host entity 151 may send an instruction in the message for the distributed mapping system 130 to generate the set of anonymized identifiers on behalf of the receiving host entity 151. In another embodiment, a third party administrator or operator may generate the set of anonymized identifiers on behalf of the receiving host entity 151 and send the set of anonymized identifiers to the distributed mapping system 130. The second anonymization policy may indicate a specific anonymized ID, such as, for example, "anon-IDx," that should be sent to sending host entities 160 that are IoT devices. The third anonymization policy may indicate another specific anonymized ID, such as, for example, "anon-IDy," that should be sent to sending host entities 160 that are mobile phones.

While these three anonymization policies are described as being determined by the receiving host entity 151, the distributed mapping system 130 may also define anonymization policies for the receiving host entity 151. For example, the distributed mapping system 130 may define default anonymization policies for receiving host entities 151 when the receiving host entities 151 do not specify an anonymization policy. For example, the distributed mapping system 130 may define one or more anonymized identifiers for a receiving host entity 151 and send one of these anonymized identifiers to a sending host entity 160 that requests the locator of the receiving host entity 151. The distributed mapping system 130 may define other anonymization policies for the receiving host entity 151. In some embodiments, the message may indicate which of the policies are public policies 409 and which are private policies 412.

At arrow 515, a response is sent from the local access point 506 to the receiving host entity 151 after the local access point 506 receives the message with the anonymization policies. For example, a Tx 225 of the local access point 506 transmits the response to the receiving host entity 151. The response may be an acknowledgement (ACK) or a negative acknowledgement (NACK) that indicates whether the local access point 506 successfully received the message from the receiving host entity 151. The response may also include other information related to the processing of the message sent by the receiving host entity 151.

At arrow 518, the local access point 506 may send the information received in the message from the receiving host entity 151 to the global system 503 and synchronize with the global system 503. For example, a Tx 225 of the local access point 506 sends the information from the message to the global system 503. The global system 503 may store the information from the message in association with the identity of the receiving host entity 151 in a manner similar to that described with reference to FIG. 4. At arrow 521, the global system 503 may synchronize with the local access point 509. For example, a Tx 225 of the global system 503 may send some information to the local access point 509 indicating that the receiving host entity 151 has created new policies or updated some policies.

At arrow 524, the sending host entity 160 sends a locator request to the local access point 509. For example, Tx 225 of the sending host entity 160 may send the locator request to the local access point 509. The locator request may be a request for a current locator of the receiving host entity 151 to enable the sending host entity 160 to send data traffic to the receiving host entity 151 at the correct location. For example, the locator request may include the U-ID of the receiving host entity 151 in response to the sending host entity 160 previously obtaining the U-ID of the receiving host entity 151. In an embodiment, the locator request may be a new message that the sending host entity 160 sends to the local access point 509. In an embodiment, the locator request may be a pre-existing message for HIP as defined in RFC 7401.

In an embodiment, the local access point 509 may again synchronize or communicate with the global system 503 to determine the current locator of the receiving host entity 151 and one or more anonymized identifiers of the receiving host entity 151 after receiving the locator request from the sending host entity 160. In an embodiment, the local access point 509 and the global system 503 maintain metadata associated with the sending host entity 160. The metadata associated with the sending host entity 160 may indicate the type of the device that the sending host entity 160 is. For example, the metadata associated with the sending host entity 160 may indicate that the sending host entity 160 is an IoT device. The local access point 509 may communicate with the global system 503 to identify whether an anonymization policy is set by the receiving host entity 151 for IoT devices. Since the second anonymization policy that the receiving host entity 151 sent to the distributed mapping system 130 applies to IoT devices, the local access point 509 and/or the global system 503 may determine that the anonymized identifier to send back to the sending host entity 160 at arrow 527 is "anon-IDx."

As another illustrative example, the metadata associated with the sending host entity 160 may indicate that the sending host entity 160 is a mobile phone. In which case, the local access point 509 may communicate with the global system 503 to identify whether a policy is set by the receiving host entity 151 for mobile phones. Since the third anonymization policy that the receiving host entity 151 sent to the distributed mapping system 130 applies to mobile devices, the local access point 509 and/or the global system 503 may determine that the anonymized identifier to send back to the sending host entity 160 should be "anon-IDy."

As yet another illustrative example, the metadata associated with the sending host entity 160 may indicate that the sending host entity 160 is a wearable device. The local access point 509 may communicate with the global system 503 to identify whether a policy is set by the receiving host entity 151 for wearable devices. In the case where the receiving host entity 151 has not set a policy for wearable devices, the local access point 509 and/or the global system 503 may determine that the anonymized identifier to send back to the sending host entity 160 should be one of the anonymized identifiers from the set of anonymized identifiers according to the first policy. Alternatively, the local access point 509 and/or the global system 503 may determine that the anonymized identifier to send back to the sending host entity 160 should be one of the anonymized identifiers defined by the default policy.

At arrow 527, the local access point 509 sends the locator and the anonymized identifier to the sending host entity 160. For example, Tx 225 of the local access point 509 sends a current locator of the receiving host entity 151 and the anonymized identifier of the receiving host entity 151 to the sending host entity 160. In an embodiment, the local access point 509 may store the anonymized identifier that is sent to the sending host entity 160 and send the anonymized identifier to the global system 503. The global system 503 may also update the database to indicate that the anonymized identifier is sent to the sending host entity 160 in a manner similar to that shown in FIG. 4.

In some embodiments, the message with the locator and the anonymized identifier of the receiving host entity 151 may be sent in a tuple format to the sending host entity 160. For example, the message sent at arrow 527 may include a tuple as follows: (locator of the receiving host entity 151, anonymized identifier of the receiving host entity 151). As should be appreciated, the message sent at arrow 527 may include other information aside from the locator and the anonymized identifier of the receiving host entity 151.

At arrow 530, the sending host entity 160 may begin to send data packets 585 to the receiving host entity 151, and the data packets 585 may indicate that the destination identifier field 580 is the anonymized identifier provided by the local access point 509 instead of the U-ID of the receiving host entity 151. For example, Tx 225 of the sending host entity 160 may transmit data packets 585 to the receiving host entity 151. In an embodiment in which IEN 500 implements IPv4 or IPv6, the data packets 585 may include an outer IP header. The outer IP header may include a source IP address field and a destination IP address field. For the data packets 585 that are sent at arrow 530, the source IP address field may include the IP address of the sending host entity 160 and the destination IP address field may include the locator of the receiving host entity 151 provided by the local access point 509. In this case, the locator of the receiving host entity 151 may be an IP address. In an embodiment, the outer IP header may also include a source identifier field and a destination identifier field 580 of the data packet 585. For the data packets 585 that are sent at arrow 530, the source identifier field 583 may include the U-ID or an anonymized identifier of the sending host entity 160, as specified by the sending host entity 160. The destination identifier field 580 may include the anonymized identifier provided by the local access point 509. In this way, the destination of the data packets 585, or the receiving host entity 151, is anonymized to outside observers of the data packet 585.

When the receiving host entity 151 receives the data packets 585 from the sending host entity 160, the receiving host entity 151 may enforce the policies by filtering out packets that are not addressed according to an applicable policy. For example, suppose the receiving host entity 151 has obtained and stores the metadata associated with the sending host entity 160, and the metadata indicates a type of device of the sending host entity 160. Suppose the receiving host entity 151 also stores the policies that the receiving host entity 151 sent to the distributed mapping system 130. The receiving host entity 151 may compare the identifier present in the destination identifier field 580 of the data packets 585 to an expected anonymized identifier based on the policies and the metadata of the sending host entity 160. In an embodiment, the receiving host entity 151 may drop packets that do not use the designated anonymized identifier as the destination identifier. For example, suppose the sending host entity 160 is an IoT device, then the expected anonymized identifier is "anon-IDx." The receiving host entity 151 may be configured to only accept data packets 585 from the sending host entity 160 if the destination identifier field 580 in the data packet 585 includes "anon-IDx." The receiving host entity 151 may also be configured to drop packets from the sending host entity 160 that include any identifier other than "anon-IDx" in the destination identifier field 580 of the data packet 585.

At arrow 533, the receiving host entity 151 may send data packets 575 back to the sending host entity 160, and the data packets 575 may include the source identifier field 570 with the anonymized identifier provided by the local access point 509 instead of the U-ID of the receiving host entity 151. The data packets 575 may also include the destination identifier field 573 with either the U-ID or an anonymized identifier of the sending host entity 160, as specified by the sending host entity 160. For example, Tx 225 of the receiving host entity 151 may transmit data packets 575 to the sending host entity 160. With this method, communication between a receiving host entity 151 and a sending host entity 160 within IEN 500 can be completely anonymous to outside observers in the IEN 500.

Figure 6:
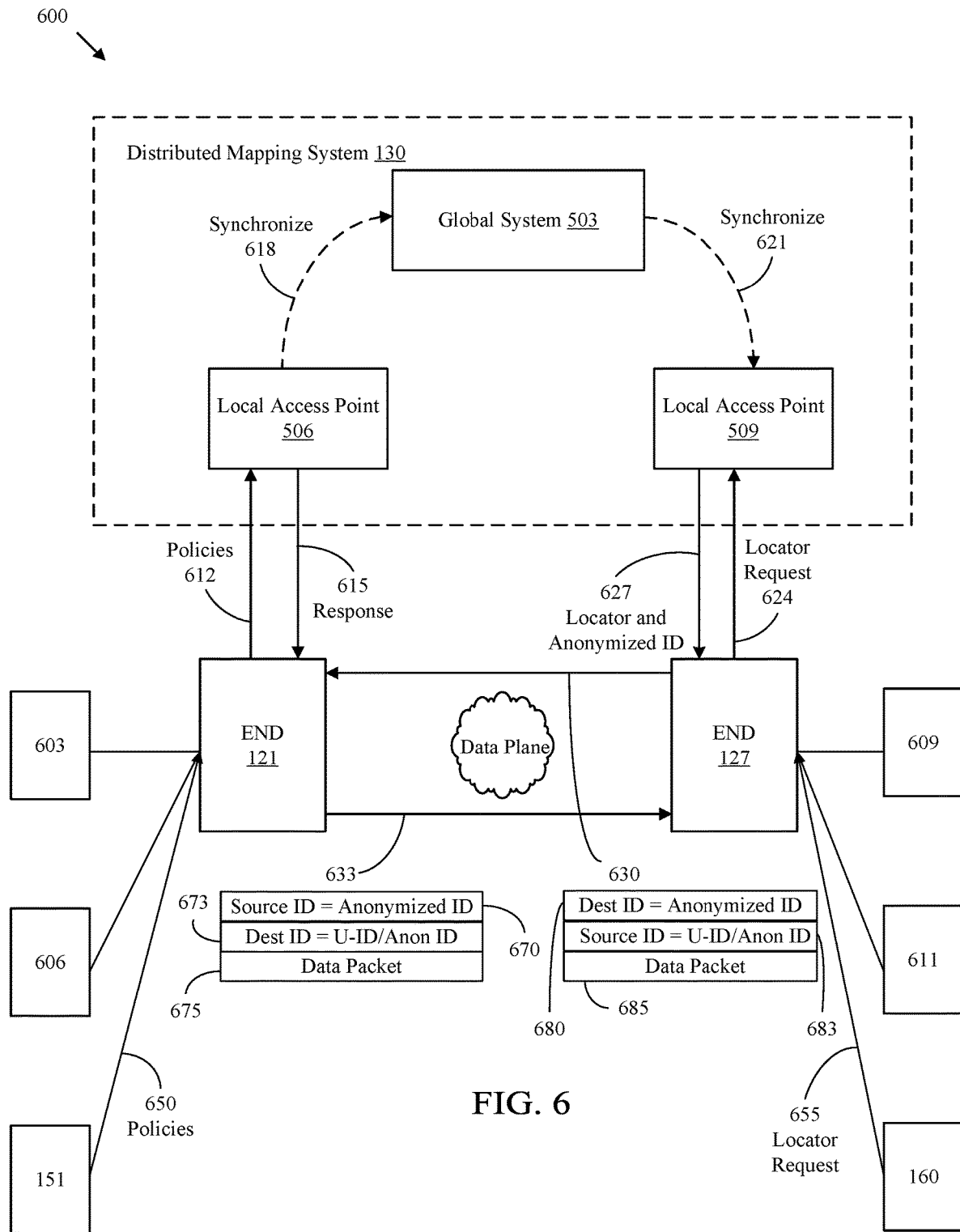
FIG. 6 illustrates an IEN implementing receiver directed anonymization using a network device based communication scheme according to an embodiment of the disclosure.

FIG. 6 illustrates an IEN 600 implementing receiver directed anonymization using a network device based communication scheme according to an embodiment of the disclosure. For example, IEN 600 is similar to IEN 500, except that IEN 600 implements a network device based communication scheme, such as LISP, where ENDs 121 and 127 communicate with each other through the distributed mapping system 130 on behalf of host entities 151 and 160. Otherwise, the data transmitted between the host entities 151 and 160, ENDs 121 and 127, and the distributed mapping system 130 are similar to that which is discussed in FIG. 5.

IEN 600 shows multiple host entities 603, 606, and 151 that are associated with, or reachable via, END 121 and multiple host entities 609, 611, and 160 that are associated with END 127. In the above case, identifier capabilities for the host entities 151 and 160 are obtained and stored by the respective ENDs 121 and 127, and host entities 151 and 160 connected to these ENDs 121 and 127 will have anonymous communication among them through the ENDs 121 and 127.

At arrow 650, the receiving host entity 151 sends a message comprising one or more policies to END 121. For example, a Tx 225 of the receiving host entity 151 sends the message to the END 121. The content of the message may be substantially the same as the content of the message sent at arrow 512 of FIG. 5. In an embodiment, END 121 may store and maintain the anonymized identifiers and policies that are contained in the message from the receiving host entity 151. The stored information may be used to setup a local policy to rate limit traffic with a particular anonymized identifier or implement a security measure not to receive any traffic if the header of the packets received does not include one of the anonymized identifiers provided by the receiving host entity 151.

At arrow 612, END 121 forwards the message to the local access point 506 on behalf of the receiving host entity 151. For example, a Tx 225 of the END 121 sends the message comprising the anonymization policies to the local access point 506. The content of the message may be substantially the same as the content of the message sent at arrow 512 of FIG. 5. At arrow 615, the local access point 506 sends a response to the END 212 after the local access point 506 receives the message with the policies. For example, a Tx 225 of the local access point 506 transmits the response to the END 121. The content of the response may be substantially the same as the content of the response sent at arrow 515 of FIG. 5. Arrows 618 and 621 are substantially the same as arrows 518 and 521 described with reference to FIG. 5. The local access point 506 synchronizes the information received from the END 121 with the global system 503 and the local access point 509. In some embodiments, the message sent at arrow 612 may be sent in a tuple format including an identifier of the sending host entity 160 and anonymized identifier of the receiving host entity 151 that should be provided to the sending host entity 160.

At arrow 655, the sending host entity 160 sends a locator request to the END 127. For example, Tx 225 of the sending host entity 160 may send the locator request to the END 127. The content of the locator request may be substantially the same as the content of the locator request sent at arrow 524 of FIG. 5. At arrow 624, END 127 forwards the locator request to the local access point 509 on behalf of the sending host entity 160. For example, Tx 225 of the END 127 may send the locator request to the local access point 509. The content of the locator request may also be substantially the same as the content of the locator request sent at arrow 524 of FIG. 5. The distributed mapping system 130 determines locators and anonymized identifiers for the sending host entity 160 similar to the methods described in FIG. 5.

At arrow 627, the local access point 509 sends the locator and the anonymized identifier to the END 127. For example, Tx 225 of the local access point 509 sends a current locator of the receiving host entity 151 and the anonymized identifier of the receiving host entity 151 to the END 127. The locator and the anonymized identifier that is sent at arrow 627 is substantially the same as the locator and anonymized identifier that is sent at arrow 527 in FIG. 5. In an embodiment, the locator and the anonymized identifier of the receiving host entity 151 is sent to the sending host entity 160 in the form of a tuple. In an embodiment, the END 127 locally stores the locator and the anonymized identifier in association with a U-ID of the receiving host entity 151. In an embodiment, the END 127 may forward the locator of the receiving host entity 151 and the anonymized identifier of the receiving host entity 151 to the sending host entity 160 such that the sending host entity 160 can also store the locator of the receiving host entity 151 and the anonymized identifier of the receiving host entity 151 in association with a U-ID of the receiving host entity 151.

At arrow 630, the END 127 may send data packets 685 to the END 121 on behalf of the sending host entity 160. For example, Tx 225 of the END 127 may transmit data packets 685 to the END 121. The data packets 685 may include the anonymized identifier provided by the local access point 509 in the destination identifier field 680 instead of the U-ID of the receiving host entity 151. The data packets 685 may be substantially the same as the data packets 585 sent at arrow 530 of FIG. 3. As shown in FIG. 6, a header of the data packets 685 includes a destination identifier field 680, which may be set as the anonymized identifier received from the distributed mapping system 130. The header may also include a source identifier field 683, which may include the U-ID or an anonymized identifier of the sending host entity 160, as specified by the sending host entity 160. In an embodiment, the END 127 may receive the data packets 585 from the sending host entity 160. In an embodiment, the END 127 may insert the anonymized identifier in the destination identifier field 680 in the outer header of the data packets 685. In an embodiment, the END 127 may also insert the locator as the address of the destination in the outer header of the data packets 685.

In an embodiment, Rx 220 of END 121 receives the data packets 685 from the END 127. In an embodiment, the network configuration module 260 of the processor 230 may determine whether the data packets 685 from END 127 include the anonymized identifier for the receiving host entity 151 based on the policies specified by the receiving host entity 151 and the metadata of the sending host entity 160 and/or the receiving host entity 151. The END 121 may only forward the data packets 685 with the correct anonymized identifier for the receiving host entity 151. In this way, data packets 685 that do not have the correct anonymized are not forwarded to the receiving host entity 151 and thus are dropped.

At arrow 633, the END 121 may send data packets 675 back to END 127 on behalf of the receiving host entity 151. For example, Tx 225 of the END 121 may transmit data packets 675 to the END 127. In an embodiment, the data packets 675 may first be sent from the receiving host entity 151, and the END 121 may include the anonymized identifier in the source identifier field 670 of the data packets 675 before forwarding the data packets 675 to the END 127. The U-ID or an anonymized identifier of the sending host entity may be included in the destination identifier field 673, as specified by the sending host entity 160. The data packets 675 sent at arrow 633 may be substantially the same as the data packets 575 sent at arrow 533 of FIG. 5.

Although END 121 is only described as communicating on behalf of receiver host entity 151, END 121 may also communicate on behalf of host entities 603 and 606 as needed. Similarly, END 127 may also communicate on behalf of host entities 609 and 611 as needed. ENDs 121 and 127 may also be configured to enforce the local policies to limit data traffic unless the data packets 675 and 685 are anonymized per the policies set by receiving host entities 151.

Figure 7:
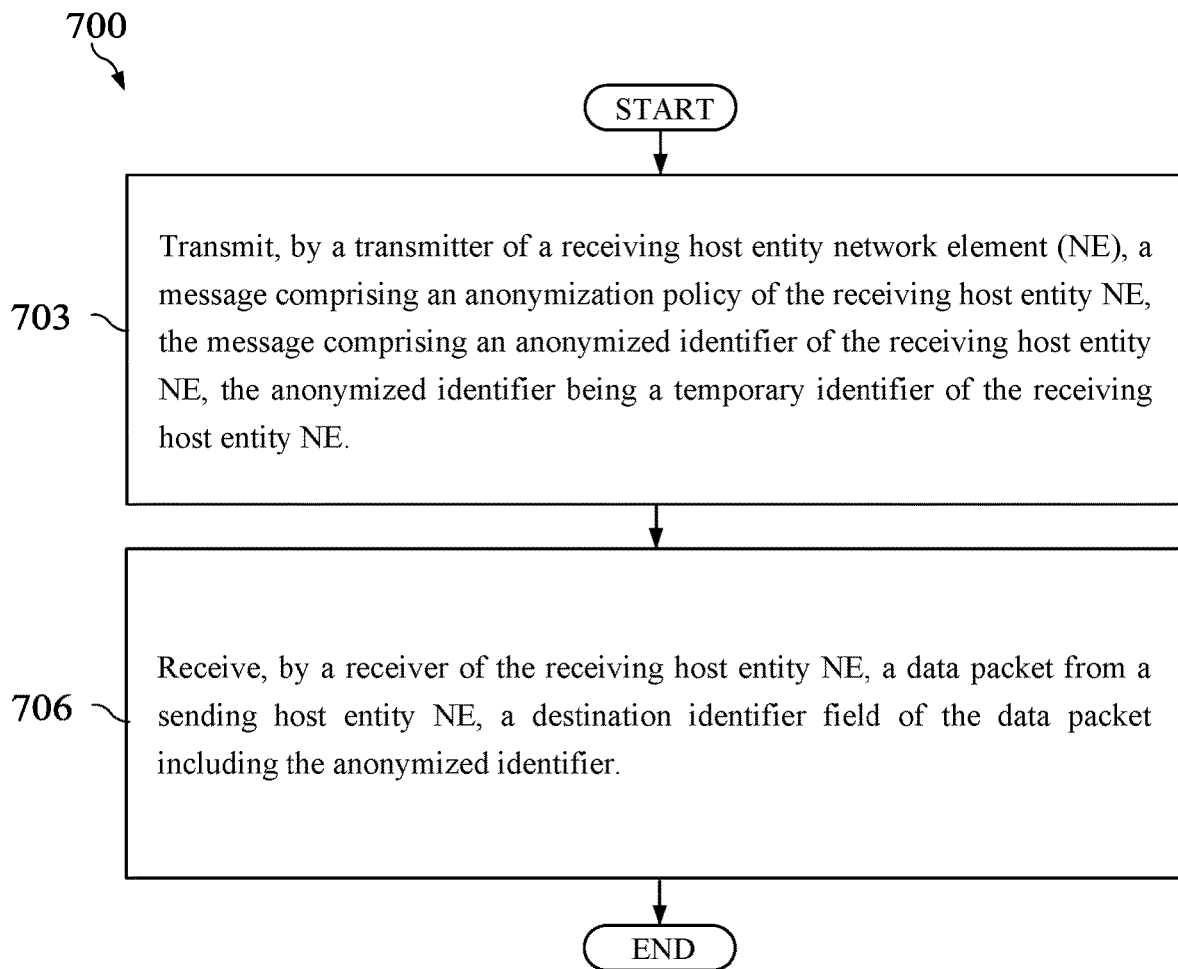
FIG. 7 is a method directed to receiver directed anonymization in an IEN.

FIG. 7 is a method 700 of receiver directed anonymization in an IEN. Method 700 may be implemented by an NE 200 in an IEN 100. The NE 200 may be implemented as either the receiving host entity 151 or the END 121 acting on behalf of the receiving host entity 151. For example, method 700 is implemented after the receiving host entity 151 has completed registration with the distributed mapping system 130. At block 703, a message comprising an anonymization policy is transmitted. For example, a Tx 225 of the receiving host entity 151 transmits the message to END 121, which then transmits the message to the distributed mapping system 130. Alternatively, Tx 225 of the receiving host entity 151 may directly transmit the message to the distributed mapping system 130. The anonymization policy comprises policy information regarding how to anonymize the receiving host entity 151. The message may comprise an anonymized identifier of the receiving host entity 151, where the anonymized identifier is a ephemeral identifier of the receiving host entity 151. An ephemeral identifier may be a temporary identifier assigned to a host entity, such as receiving host entity 151.

At block 706, a data packet is received from a sending host entity 160. For example, the Rx 220 of the receiving host entity 151 may receive the data packet directly from the sending host entity 160. Alternatively, the Rx 220 of the END 121 may receive the data packet from END 127, and the Tx 225 of END 121 may transmit the data packet to the receiving host entity 151 based on whether the correct anonymized identifier is present in the data packet. In an embodiment, the destination identifier field of the data packet should include the anonymized identifier for the receiving host entity 151 to process the data packet. If the destination identifier field of the data packet does not include the correct anonymized identifier for the receiving host entity 151, the data packet may be discarded.

Figure 8:
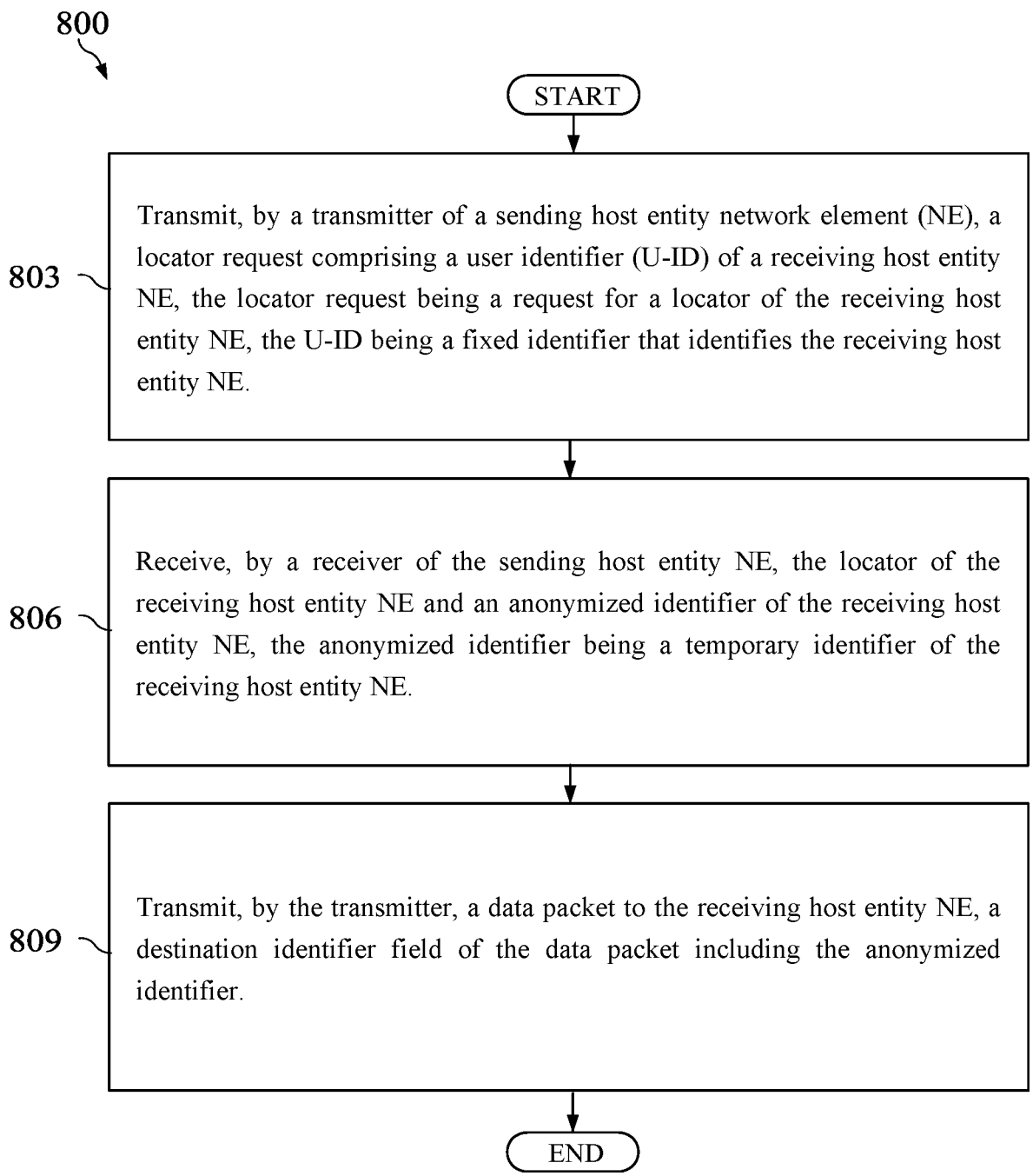
FIG. 8 is a method directed to receiver directed anonymization in an IEN.

FIG. 8 is a method 800 of receiver directed anonymization in an IEN. Method 700 may be implemented by an NE 200 in an IEN 100. The NE 200 may be implemented as either the sending host entity 160 or the END 127 acting on behalf of the sending host entity 160. For example, method 800 is implemented after the sending host entity 160 has completed subscription with the distributed mapping system 130. At block 803, a locator request is transmitted to the distributed mapping system 130. For example, the Tx 225 of the sending host entity 160 may transmit the locator request directly to the distributed mapping system 130. Alternatively, the Tx 225 of the sending host entity 160 may transmit the locator request to END 127, which then transmits the locator request to the distributed mapping system 130 on behalf of the sending host entity 160. The locator request may be a request for a locator of the receiving host entity 151. The locator request may comprise the U-ID of the receiving host entity 151, where the U-ID is a fixed identifier that identifies the receiving host entity 151.

At block 806, the locator of the receiving host entity 151 and an anonymized identifier of the receiving host entity 151 are received. For example, the Rx 220 of the sending host entity 160 may receive the locator and the anonymized identifier directly from the distributed mapping system 130. Alternatively, the Rx 220 of the END 127 may receive the locator and the anonymized identifier from the distributed mapping system 130, and the Tx 225 of the END 127 may transmit the locator and anonymized identifier to the sending host entity 160. The anonymized identifier of the receiving host entity 151 may be an ephemeral identifier of the receiving host entity 151.

At block 809, a data packet may be transmitted to the receiving host entity 151. For example, the Tx 225 of the sending host entity 160 may directly transmit the data packet to the receiving host entity 151. Alternatively, the Tx 225 of the sending host entity 160 may transmit the data packet to the END 127. The Tx 225 of the END 127 may then transmit the packet to the END 121 associated with the receiving host entity 151. The destination identifier field of the data packet may include the anonymized identifier received from the distributed mapping system 130.

Figure 9:
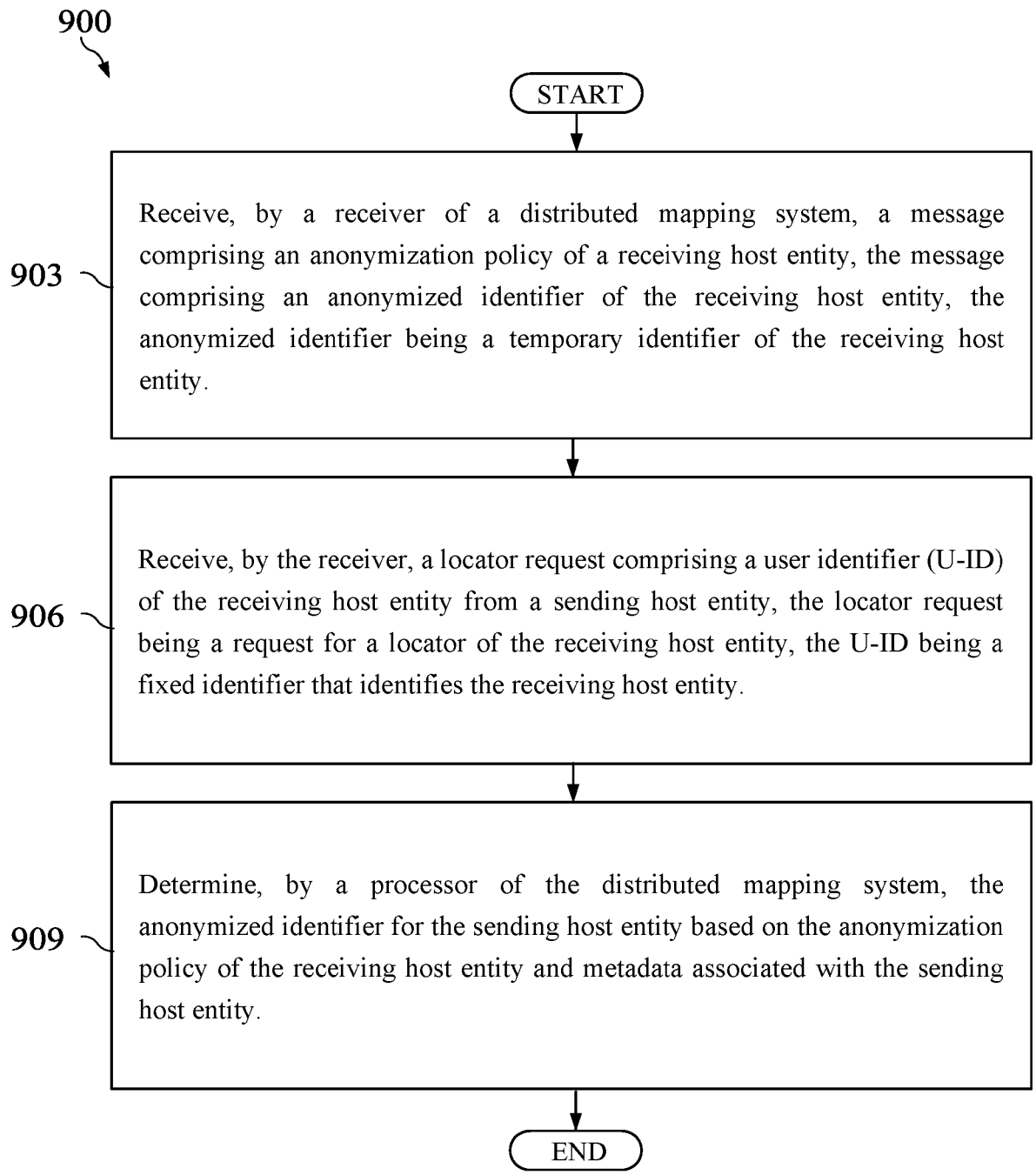
FIG. 9 is a method directed to receiver directed anonymization in an IEN.

FIG. 9 is a method 900 directed to receiver directed anonymization in an IEN. Method 900 may be implemented by an NE 200 in IEN 100. The NE 200 may be implemented as a distributed mapping system 130. For example, method 900 is implemented after the receiving host entity 151 and the sending host entity 160 have both completed subscription with the distributed mapping system 130. At block 903, a message comprising an anonymization policy of the receiving host entity 151 is received. For example, Rx 220 of the distributed mapping system 130 may receive the message directly from the receiving host entity 151 or from the END 121 acting on behalf of the receiving host entity 151. The message may comprise an anonymized identifier of the receiving host entity 151, where the anonymized identifier is an ephemeral identifier of the receiving host entity 151.

At block 906, a locator request comprising a U-ID of the receiving host entity 151 is received. For example, Rx 220 of the distributed mapping system 130 may receive the locator request directly from the sending host entity 160 or from the END 127 acting on behalf of the sending host entity 160. The locator request may be request for a locator of the receiving host entity 151. The U-ID may be a fixed identifier that uniquely identifies the receiving host entity 151.

At block 909, the anonymized identifier is determined for the sending host entity 160 on behalf of the receiving host entity 151 based on the anonymization policy for the receiving host entity 151 and metadata associated with the sending host entity 160. For example, the processor 230 determines the anonymized identifier on behalf of the anonymization policy for the receiving host entity 151 and the metadata associated with the sending host entity 160. In some embodiments, the anonymized identifier is sent back to the sending host entity 160 or the END 127 along with a locator of the receiving host entity 151.

In an embodiment, the disclosure includes a means for transmitting a message comprising an anonymization policy of the receiving host entity, the message comprising an anonymized identifier of the receiving host entity, the anonymized identifier being an ephemeral identifier of the receiving host entity, and receiving a data packet from a sending host entity, a destination identifier field of the data packet including the anonymized identifier.

In an embodiment, the disclosure includes a means for transmitting a locator request comprising a U-ID of a receiving host entity, the locator request being a request for a locator of the receiving host entity, and the U-ID being a fixed identifier that identifies the receiving host entity, and a means for receiving the locator of the receiving host entity and an anonymized identifier of the receiving host entity, the anonymized identifier being an ephemeral identifier of the receiving host entity, wherein the transmitter is further configured to transmit a data packet to the receiving host entity, a destination identifier field of the data packet including the anonymized identifier.

In an embodiment, the disclosure includes a means for receiving a message comprising an anonymization policy of a receiving host entity, the message comprising an anonymized identifier of the receiving host entity, the anonymized identifier being an ephemeral identifier of the receiving host entity, a means for receiving a locator request comprising a U-ID of the receiving host entity from a sending host entity, the locator request being a request for a locator of the receiving host entity, the U-ID being a fixed identifier that identifiers the receiving host entity, and a means for determining the anonymized identifier for the sending host entity based on the anonymization policy defined by the receiving host entity and metadata describing the sending host entity.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a receiving host entity, comprising:
   transmitting, by a transmitter of the receiving host entity, a message comprising an anonymization policy of the receiving host entity, wherein the message comprises an anonymized identifier of the receiving host entity, and wherein the anonymized identifier is a temporary and recyclable identifier identifying the receiving host entity; and
   receiving, by a receiver of the receiving host entity, a data packet from a sending host entity, wherein the data packet comprises a destination identifier field carrying the anonymized identifier.

2. The method of claim 1, wherein the message further comprises a location of an endpoint network device (END) by which the receiving host entity is reachable.

3. The method of claim 1, wherein the message is transmitted to an endpoint network device (END) communicatively coupled to a receiving host entity, and wherein the END transmits the message to a distributed mapping system.

4. The method of claim 1, wherein the data packet comprises a destination address field carrying a locator of the receiving host entity, wherein the locator is an address of the receiving host entity.

5. The method of claim 1, further comprising determining whether a header of the data packet carries the anonymized identifier in the destination identifier field of the data packet.

6. The method of claim 1, further comprising:
   storing, by a memory of the receiving host entity, a local policy indicating whether to accept the data packet including the anonymized identifier; and
   accepting, by the processor, the data packet when the local policy indicates that data packets including the anonymized identifier are acceptable.

7. The method of claim 1, wherein metadata associated with the sending host entity is used to determine the anonymized identifier for the sending host entity.

8. A endpoint network device (END) associated with a sending host entity, comprising:
   a transmitter configured to transmit a locator request comprising a user identifier (U-ID) of a receiving host entity, wherein the locator request is a request for a locator of the receiving host entity, and wherein the U-ID is a fixed identifier that identifies the receiving host entity; and
   a receiver coupled to the transmitter and configured to receive the locator of the receiving host entity and an anonymized identifier of the receiving host entity, wherein the anonymized identifier is a temporary and recyclable identifier identifying the receiving host entity, wherein the transmitter is further configured to transmit a data packet to the receiving host entity, and wherein the data packet comprises a destination identifier field carrying the anonymized identifier.

9. The END of claim 8, wherein the anonymized identifier is determined based on a policy specified by the receiving host entity.

10. The END of claim 8, wherein the anonymized identifier is associated with different host entities at different times.

11. The END of claim 8, wherein the locator request is received from the sending host entity, and wherein the locator request is transmitted to a distributed mapping system.

12. The END of claim 8, wherein the data packet is transmitted to an END associated with the sending host entity.

13. The END of claim 8, further comprising a memory coupled to the transmitter and the receiver and configured to store the anonymized identifier in association with the U-ID of the receiving host entity.

14. A method implemented by a distributed mapping system, comprising:
   receiving, by a receiver of the distributed mapping system, a message comprising an anonymization policy of a receiving host entity, wherein the message comprises an anonymized identifier of the receiving host entity, and wherein the anonymized identifier is a temporary and recyclable identifier identifying the receiving host entity;
   receiving, by the receiver, a locator request comprising a user identifier (U-ID) of the receiving host entity from a sending host entity, wherein the locator request is a request for a locator of the receiving host entity, and wherein the U-ID is a fixed identifier that identifies the receiving host entity; determining, by a processor coupled to the receiver, the anonymized identifier for the sending host entity based on the anonymization policy defined by the receiving host entity and metadata describing the sending host entity; and
   transmitting, by a transmitter coupled to the processor, the anonymized identifier to the sending host entity for data transmission.

15. The method of claim 14, wherein the metadata includes a type of device of the sending host entity.

16. The method of claim 14, further comprising transmitting, by the transmitter, a locator of the receiving host entity to the sending host entity.

17. The method of claim 14, wherein the anonymization policy includes a set of anonymized identifiers, and wherein determining the anonymized identifier for the sending host entity comprises selecting one of the anonymized identifiers in the set of anonymized identifiers for the sending host entity.

18. The method of claim 14, wherein the message further includes a current locator of the receiving host entity.

19. The method of claim 14, further comprising receiving, by the receiver, a policy update from the receiving host entity, wherein the policy update comprises an update to the anonymization policy of the receiving host entity.

20. The method of claim 14, wherein the metadata comprises private metadata and public metadata.

\* \* \* \* \*

UNITED STATES PATENT AND TRADEMARK OFFICE
CERTIFICATE OF CORRECTION

PATENT NO. : 10,735,316 B2
APPLICATION NO. : 15/833180
DATED : August 4, 2020
INVENTOR(S) : Uma S. Chunduri et al.

It is certified that error appears in the above-identified patent and that said Letters Patent is hereby corrected as shown below:

On the Title Page

Page 2, Second column, Lines 15-16, should read:
Orava, P., et al., "Temporary MAC Addresses for Anonymity," XP040383750, IEEE P802.11, Wireless LANs, Jun. 2002, 17 pages.

Signed and Sealed this
Eighth Day of September, 2020

Andrei Iancu
*Director of the United States Patent and Trademark Office*